United States Patent [19]

Lenox

[11] 4,140,891

[45] Feb. 20, 1979

[54] ARTICULATED RESISTANCE WELDING ELECTRODE WITH UNIVERSAL MOVEMENT

[75] Inventor: Clayton R. Lenox, Allen Park, Mich.

[73] Assignee: General Motors Corporation, Detroit, Mich.

[21] Appl. No.: 877,087

[22] Filed: Feb. 13, 1978

[51] Int. Cl.² .................. B23K 11/30; B23K 11/10
[52] U.S. Cl. .................. 219/120; 219/86.31; 219/89
[58] Field of Search ............ 219/86, 25, 86.31, 119, 219/120, 89, 86.51, 86.1, 91.2

[56] References Cited

U.S. PATENT DOCUMENTS

| | | | |
|---|---|---|---|
| 2,179,693 | 11/1939 | Goldstein | 219/120 |
| 2,523,367 | 9/1950 | Holt | 219/120 |
| 2,883,516 | 4/1959 | Bek | 219/89 |
| 3,576,418 | 4/1971 | Sands et al. | 219/86.31 |

Primary Examiner—J. V. Truhe
Assistant Examiner—Keith E. George
Attorney, Agent, or Firm—Warren D. Hill

[57] ABSTRACT

A resistance welding electrode is formed of a hollow shank carrying current and cooling fluid and an electrode head connected to the shank by a flexible housing of insulated material. The housing forms a chamber to contain the cooling fluid supplied through the shank. The flexibility of the housing allows the head to rock relative to the shank and also to move axially away from the shank under the influence of the pressure of the cooling fluid. When welding pressure is applied through the electrode to a workpiece, the shank is forced against the head to provide firm electrical engagement between those elements.

3 Claims, 3 Drawing Figures

ARTICULATED RESISTANCE WELDING ELECTRODE WITH UNIVERSAL MOVEMENT

This invention relates to resistance welding electrodes and particularly to such electrodes having a universally movable head to conform to a workpiece surface.

In the practice of resistance welding it is often desirable to use a welding electrode having a swivel head to conform to workpiece surface areas which are not normal to the chief axis of the electrode. This feature is particularly important where it is desired to use large electrode surface areas to minimize marring of a workpiece surface area by electrode indentation. Further, in such applications, it is desired to use extraordinarily good cooling of the electrode and workpiece to prevent buckling of the workpiece. It has previously been suggested in the copending patent application of Bakewicz et al. U.S. Ser. No. 779,016 entitled "Non-Marring Spot Weld Tip" to connect the welding electrode head to its support member through a coil spring which allows swiveling of the head and further allows separation of the head from the current carrying shank for the improvement of cooling of the electrode head and the workpiece. There the coolant is carried directly to and from a cavity in the head by hoses external to the electrode. The present invention provides an improved welding electrode arrangement which obviates the requirement of the coil spring and the external hoses.

Commercially available swivel electrode arrangements are known, most of which use a ball and socket design. Such designs do not properly handle large currents which are required in welding. Moreover, after a certan amount of usage, such ball and socket type electrodes tend to hang up in various off center positions thereby causing indentations in the workpiece when the electrode is brought in contact with the workpiece surface.

It is, therefore, a general object of the invention to provide in a resistance welding electrode a swivel feature in which the electrode head easily moves relative to the electrode shank without significant frictional resistance and further to provide in such an electrode arrangement the facility of separating the welding head from the shank between welding events to allow free circulation of cooling fluid about the head and the shank. It is a further object to provide such a welding electrode with a universally movable head in which external coolant hoses to the head are not required.

The invention is carried out by providing an electrode shank for carrying welding current which is hollow to carry pressurized circulating cooling fluid and an electrode head which is connected to the shank through a flexible housing, the housing forming with the head and the shank an expansible chamber for containing the cooling fluid wherein the flexible housing allows rocking movement of the head about the end of the shank as well as axial separation of the head and the shank in response to coolant pressure when no welding pressure is applied.

The above and other advantages will be made more apparent from the following specification taken in conjunction with the accompanying drawings wherein like reference numerals refer to like parts and wherein.

Figure 1:
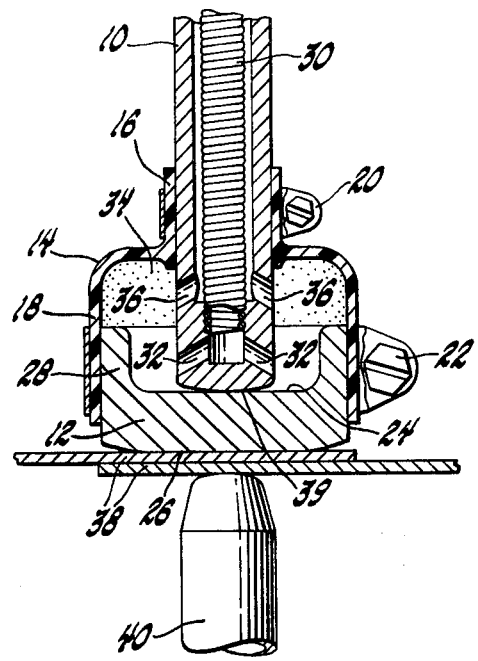
FIG. 1 is a cross sectional elevational view of a welding electrode according to the invention and its relationship to a workpiece and an opposing conventional electrode.

Referring to FIG. 1, the resistance welding electrode according to the invention includes a hollow copper shank 10, a large surface area copper electrode 12 separate from the shank 10 and a flexible housing 14 of insulating elastomeric material which interconnects the shank and the head. The material of the housing can be neoprene reinforced with cotton cloth, for example. The housing 14 includes a small diameter neck portion 16 which fits around the outer surface of the shank 10 and an opposite end 18 of large diameter to fit around the outer diameter of the head 12. Hose clamps 20 and 22 clamp the portions 16 and 18 to the shank 10 and head 12 respectively. Th head 12 has an inner wall 24 for engagement with the end of the shank 10 and an outer workpiece flat contact area 26 having a slightly rounder peripheral area. Upturned side walls 28 on the head 12 provide a broad outer surface for the clamping of the housing to the head and provide a cup-shaped interior cavity receiving the tip of the shank 10.

The shank 10 is hollow and has a slightly reduced inner diameter at its lower end. A flexible tube 30 which carries pressurized cooling fluid such as water from a conventional source of such coolant fits within the shank. The flexible tube 30 terminates just short of the bottom of the shank 10 and engages the inner walls of the shank at the region of reduced diameter. The remainder of the shank has a clearance between the inner shank wall and the flexible tube 30 to allow coolant flow. Lower parts 32 extending through the wall of the of shank 10 allow coolant to flow from the flexible tube 30 into the chamber 34 formed by the housing 14, the shank 10 and the inner wall 24 of the head. An upper set of ports 36 through the wall of the shank 10 connect the chamber 34 with the space between the flexible tube 30 and the inner wall of the shank 10 to allow return of the cooling fluid from the chamber. As shown in FIG. 1, the electrode is in position for making a weld, that is, it is pressed against overlapping workpieces 38 and an opposing conventional electrode 40 on the other side of the workpiece 38 to complete the welding circuit. Since the work engaging surface 26 of the head 12 is very large relative to the size of the electrode 40 and the size of the weld nugget to be formed will be consistent with the smaller electrode, the welding force applied by the head 12 is distributed over portions of the workpiece 38 not softened by the welding so that little or no indentation occurs on the portion of the workpiece contacting the head 12. The cooling fluid flowing through the shank 10 and the chamber 34 removes heat from the head 12, the shank 10 and the housing 14. A convex or rounded end 39 of the shank 10 allows rocking movement of the head relative to the shank as the head is being urged into contact with the workpiece 38 thereby allowing the head to conform to the orientation of the workpiece surface even if the workpiece is not normal to the axis of the shank 10. The swivel feature of the electrode will readily accommodate a workpiece misorientation of up to 5 degrees. The flexible housing 14 is, however, stiff enough to hold the head in its neutral position when weld pressure is not applied.

Figure 2:
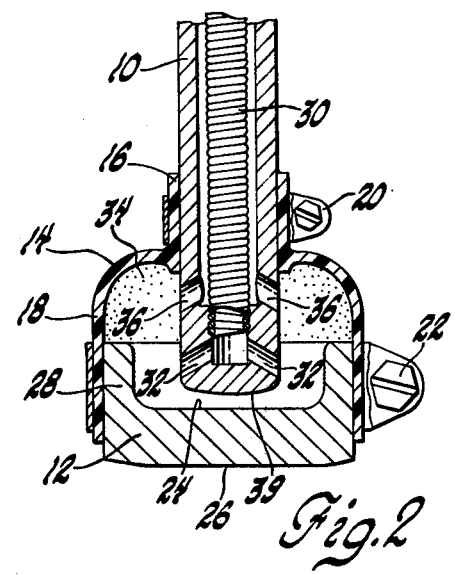
FIG. 2 is a cross sectional elevational view of the electrode of FIG. 1 shown in the condition when welding pressure is not being applied to a workpiece to allow separation of the head from the shank.

FIG. 2 illustrates the electrode of FIG. 1 in a condition when the cooling fluid is applied to the head but welding force is not applied. As in the case of conventional welding apparatus, cooling fluid is under pressure on the order of 50 p.s.i. In that case, the force of the cooling fluid against the inner wall 24 of the head 12 causes the head to separate a small distance from the end 39 of the shank 10. The flexible material of the housing 14, of course, allows that axial movement of the head as well as the rocking movement of the head as described above. The separation of the head from the shank facilitates cooling of both of those members between welds. It will be apparent that the separation of the head from the shank will facilitate orientation or conformance of the head 12 with the workpiece surface when it first engages that surface even before the shank 10 engages the head 12. The gap between the head and shank allows a cushioning effect to occur when weld pressure is first applied to soften the engagement of the head and workpiece. Compliance in the coolant system allows the shank to gently contact the head. Another advantage of this design is that the head 12 can be quickly and inexpensively replaced by loosening the hose clamp 22. In addition, the shank 10 is a standard shelf item except for the water circulating ports and the flexible tubing 30 is a standard part of welding gun cooling systems.

Figure 3:
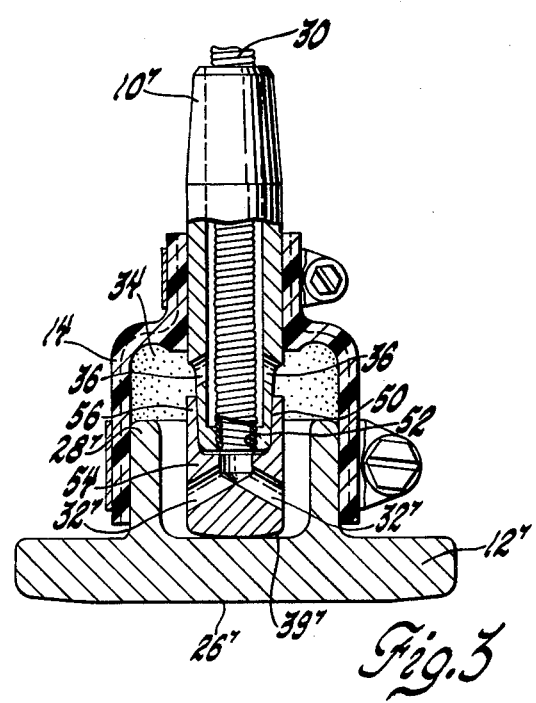
FIG. 3 is a cross sectional elevational view of a second embodiment of the weld electrode according to the invention.

FIG. 3 illustrates another embodiment of a welding electrode which differs from that of FIGS. 1 and 2 chiefly in the design of the bottom tip of the shank 10'. The bottom end of that element is machined to a taper 50 on its outer circumference and the end is drilled and tapped to provide a hole 52 into which the flexible tube 30 is threaded. This construction allows the exact positioning of the flexible tube to be made within the hollow shank 10' with each since the end of the tube 30 can be readily seen. A cap 54 has an upstanding tubular sidewall 56 which is internally tapered to mate with the taper 50 on the shank 10'. The remainder of the cap is generally cylindrical and includes a rounded end 39' which engages the head 12' and further includes ports 32' which provide the passage of coolant from the hose 30 into the chamber 34. The ports 36 in the side of the shank 10' allow a return of the circulating fluid as in the embodiment of FIG. 1. This design allows the easy removal of the cap 54 when it becomes worn or damaged so that replacement is readily made whenever the head 12' is removed.

The head 12' differs from the head 12 of FIG. 1 chiefly in that it has a lip extending beyond the side walls 28' to effectively enlarge the workpiece surface engaging area 26'. Thus, even though the housing 14 and the cylindrical side wall 28' has a given diameter, the head 12' may have its workpiece engaging surface of any desired size and yet be interchangeable with similar heads of different workpiece engaging surface sizes. A further advantage of the shank 10' is that it and the cap 54 are shelf items except for the water holes.

It will thus be seen that the invention described herein provides an improved resistance welding electrode wherein universal articulation is achieved to allow easy rocking movement of the head relative to the shank for better cooling. Moreover, the fabrication of the welding head according to the invention is easily carried out since the maximum use is made of conventional items.

The embodiments of the invention in which an exclusive property or privilege is claimed are defined as follows:

1. A resistance welding electrode for producing spot welds on a workpiece comprising:
    a hollow electrically conductive shank for conducting welding current and for carrying pressurized cooling fluid and including fluid circulating ports extending through the wall of the shank,
    an electrode head having an inner wall and an outer workpiece contact area, and
    a tubular flexible housing formed of insulating material connecting said electrode head and said shank and supporting said head on said shank for universal movement relative thereto, said tubular housing forming with said shank and the said inner wall of the electrode head an expansible chamber surrounding said fluid circulating ports and communicating with the interior of said hollow shank to contain the pressurized cooling fluid, whereby when welding pressure is applied to said shank the flexible housing permits rocking movement of said electrode head to conform the workpiece contact area to the workpiece and further permits movement of said shank against said head to apply welding current to the head and thence to the workpiece, and whereby when welding pressure is released the chamber axially expands under the influence of the pressurized cooling fluid to axially separate the head and the shank to expedite electrode cooling.

2. A resistance welding electrode for producing spot welds on a workpiece comprising:
    a hollow electrically conductive shank for conducting welding current and for carrying pressurized cooling fluid and including first fluid circulating ports extending through the wall of the shank and a hole extending through the end of the shank,
    a hollow conductive cap removably secured to the end of the said shank and covering said hole to receive current and cooling fluid from the shank, the cap having a tubular side wall and a rounded end, and second fluid circulating ports extending through the side wall of the cap,
    an electrode head having an inner wall and an outer workpiece contact area, and
    a tubular flexible housing formed of insulating material connecting said electrode head and said shank and supporting said head on said shank for universal movement relative thereto, said tubular housing forming with said shank and the said inner wall of the electrode head an expansible chamber surrounding said fluid circulating ports and communicating with the interior of said hollow shank to contain the pressurized cooling fluid, whereby when welding pressure is applied to said shank the flexible housing permits rocking movement of said electrode head to conform the workpiece contact area to the workpiece and further permits movement of said cap against said head to apply welding current to the head and thence to the workpiece, and whereby when welding pressure is released the chamber axially expands under the influence of the pressurized cooling fluid to axially separate the head and the cap to expedite electrode cooling.

3. A resistance welding electrode for producing spot welds on a workpiece comprising:

a hollow electrically conductive shank for conducting welding current and for carrying pressurized cooling fluid and including fluid circulating ports extending through the wall of the shank, an electrode head having an inner wall and an outer workpiece contact area, and a tubular flexible housing formed of insulating elastomer material connecting said electrode head and said shank and supporting said head on said shank for universal movement relative thereto, said tubular housing forming with said shank and the said inner wall of the electrode head an expansible chamber surrounding said fluid circulating ports and communicating with the interior of said hollow shank to contain the pressurized cooling fluid, the flexible housing being sufficiently yieldable in the axial direction to allow axial separation of the said shank and said head by the pressure of the cooling fluid and being sufficiently stiff to maintain the head in a neutral orientation with respect to the shank when the head is out of engagement with the workpiece, whereby when welding pressure is applied to said shank the flexible housing permits rocking movement of said electrode head to conform the workpiece contact area to the workpiece and further permits cushioned movement of said shank against said head to apply welding current to the head and thence to the workpiece, and whereby when welding pressure is released the chamber axially expands under the influence of the pressurized cooling fluid to axially separate the head and the shank to expedite electrode cooling.

* * * * *

UNITED STATES PATENT AND TRADEMARK OFFICE
CERTIFICATE OF CORRECTION

PATENT NO. : 4,140,891

DATED : February 20, 1979

INVENTOR(S) : Clayton R. Lenox

It is certified that error appears in the above-identified patent and that said Letters Patent are hereby corrected as shown below:

Column 2, line 20, "Th" should read -- The --;
          line 36, "parts" should read -- ports --;
          line 47, "workpiece" should read -- workpieces --.

Column 3, line 36, "each" should read -- ease --.

Signed and Sealed this

Twelfth Day of June 1979

[SEAL]

Attest:

RUTH C. MASON
Attesting Officer

DONALD W. BANNER
Commissioner of Patents and Trademarks